(No Model.)
J. MOSELEY.
PNEUMATIC TIRE.
No. 596,819.      Patented Jan. 4, 1898.
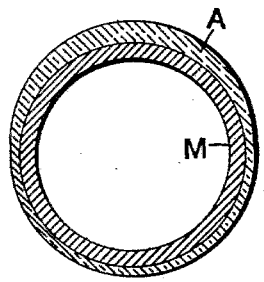
FIG. 1.
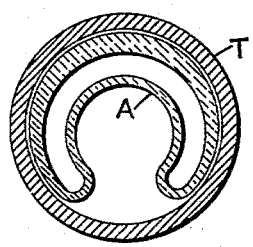
FIG. 2.
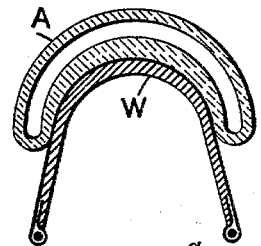
FIG. 2.$^a$
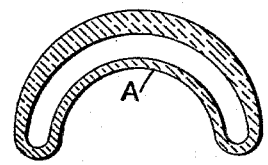
FIG. 3.
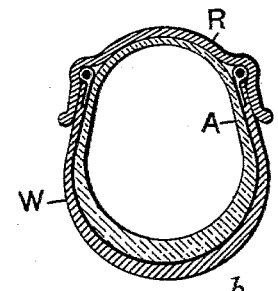
FIG. 2.$^b$
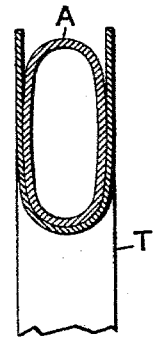
FIG. 4.
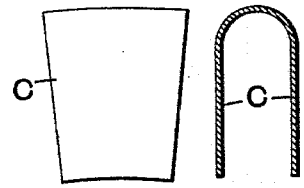
FIG. 6.    FIG. 7.
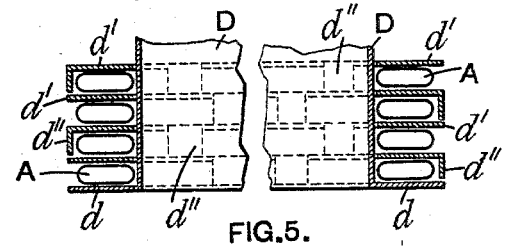
FIG. 5.
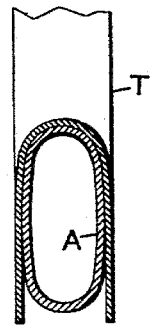
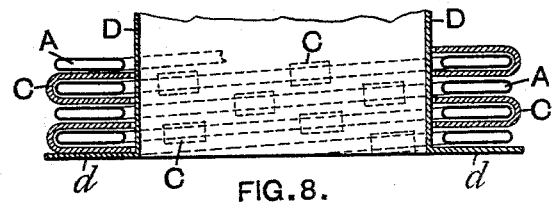
FIG. 8.
WITNESSES          INVENTOR

UNITED STATES PATENT OFFICE.

JOSEPH MOSELEY, OF MANCHESTER, ENGLAND.

PNEUMATIC TIRE.

SPECIFICATION forming part of Letters Patent No. 596,819, dated January 4, 1898.

Application filed March 18, 1897. Serial No. 628,211. (No model.) Patented in England June 14, 1895, No. 11,593, and in France March 13, 1896, No. 254,727.

*To all whom it may concern:*

Be it known that I, JOSEPH MOSELEY, a citizen of the United Kingdom of Great Britain and Ireland, residing at Manchester, in the county of Lancaster, England, have invented certain new and useful Improvements in Pneumatic Tires, (for which I have obtained patents in Great Britain, No. 11,593, dated June 14, 1895, and in France, No. 254,727, dated March 13, 1896,) of which the following is a specification.

The object of this invention is to simplify and facilitate the manufacture of india-rubber tubes—such, for example, as are used in pneumatic tires. In the customary process these tubes are manufactured upon a mandrel, with or without an external wrapping of cloth. According to these improvements the tubes are vulcanized within metallic or glass tubes or the like, or in formers, or a series of clips or other equivalent device or devices.

I will describe my invention with reference to the accompanying drawings, Figure 1 of which represents, as an example, a non-puncturing tube in cross-section during the first stage of its manufacture. Fig. 2 shows the tube collapsed. Fig. 2ª shows the collapsed tube with a reversed tire-cover applied to it. Fig. 2ᵇ shows the same tube inflated, with the cover inclosing it. Fig. 3 shows a collapsed tube in a tubular holder. Fig. 4 shows a tire in a flattened circular former. Fig. 5 shows a group of formers. Figs. 6 and 7 show a clip to be used in place of the continuous former. Fig. 8 shows a tire coiled in a spiral and held in shape by the clips.

The tube A is constructed from the sulfurized india-rubber or india-rubber compound either upon a suitable mandrel M or in any convenient manner, one side of the tube being, in this case, thicker than the other. The tube having been constructed and removed from the core or mandrel, if constructed thereon, is collapsed, as shown by Figs. 2 and 2ª. As shown by Fig. 2, the thinner part is collapsed within the thicker and the reverse in Fig. 2ª. The collapsed tube is then inserted within the external tube T, as illustrated by Fig. 3 in cross-section, the external tube being of such a length and diameter that the collapsed tube fits freely within it. The rubber tube is vulcanized with the external tube and is afterward withdrawn therefrom and may be turned outside in.

In the modification illustrated by cross-section in Figs. 2ª and 2ᵇ the thicker part of the air-tube has been collapsed within the thinner part of the tube. In this case I may take an ordinary pneumatic tire-cover W, a "Dunlop-Welch," for example, and after reversing its curvature I may cement it within the concave part of the collapsed tube, as shown by Fig. 2ª. I then reverse the curvature of the tube and attached cover, so that they relatively occupy the positions shown by Fig. 2ᵇ, which represents the tube and cover upon the rim R, the tube being supposed to be inflated. By this arrangement I bring the tube at the tread into severe compression and have a tire which may be readily attached to or removed from the rim of a wheel by known means.

If I vulcanize the rubber tube within a former instead of within an external tube, I may construct the rubber tube as hereinbefore described, and may then partially vulcanize it, but only sufficiently to "set" it. The former which I may employ may consist of a circular trough with its opening upon its periphery, as indicated by Fig. 4, where the trough T, with the tube contained therein, is illustrated in cross-section, a part of the trough being shown as broken away. It should have a diameter about equal to that of the wheel with which the tube is to be used and a breadth less than that of the inflated tube or tire. I have found that this form gives superior results in practice, and therefore prefer it. The tube after being partly vulcanized, as before set forth, is placed upon the former T, with one end tucked into the other to form the joint, and in this condition it is vulcanized or its vulcanization is completed. If it be desired to open out the tube after vulcanization, the ends may be coated with French chalk to prevent adhesion; but otherwise the ends may be vulcanized, so as to unite and form a closed annular tube.

I may vulcanize a number of the air-tubes simultaneously within a series of the formers in a similar manner by using a drum or frame, upon which a series of the tube-containing formers may be arranged and held; but in such a case space may be economized by the adoption of the modification illustrated in cross-section by Fig. 5. As is shown, D is a drum of sheet metal having a flange $d$ at its lower end. A number of loose flanges $d'$ are provided to fit freely upon the drum. A suitable number of the air-tubes having been constructed as hereinbefore described and partially vulcanized or not are arranged around the drum D and the ends of the tubes are tucked one within another, as described, for the separate former. One of the loose flanges $d'$ is placed over the first tube, and upon this loose flange the second tube is arranged similarly to the first. This is repeated until the drum is filled or until as many tubes as may be required have been arranged thereon, a loose flange being placed between contiguous tubes. The drum, with the tubes thereon, is then transferred to a stove or steam-pan, where the vulcanization of the air-tubes is completed or effected by heat, as is well understood. The loose flanges may have a number of distance-pieces $d''$ at or near their edges to preserve uniformity of space between the flanges. The flanges are thus the precise equivalents of the series of formers already hereinbefore described, but with the advantage of a great reduction in cost and weight.

It is sometimes necessary to construct, form, and vulcanize a tube having such a total length that a former or drum of the necessary diameter would be inconvenient to handle or to employ in vulcanization. In such cases a slight modification in the loose flanges $d'$, described with reference to Fig. 5, may be employed. Suppose each flange to be divided at one point only by a radial cut and that two such flanges be placed one over the other with their dividing-cuts vertical. If now the right-hand side of the cut of the upper flange be joined to the left-hand side of the cut of the lower flange, a spiral of two turns will be formed. If more turns be required, more flanges are joined in the same way. The spiral former thus produced having been placed upon the drum, the tube is arranged in the spiral, commencing at the bottom; but in this case the ends cannot be tucked one within the other.

It will be obvious that the spiral former may be constructed in a similar manner from short segments. The spiral arrangement of the tube upon the drum is shown by Fig. 8 in cross-section; but, as illustrated, a series of clips C are substituted for the spiral former. Each clip may have the form shown in elevation by Fig. 6 and in cross-section by Fig. 7, these figures being drawn on a larger scale. The air-tube is arranged spirally upon the drum, commencing at the flange $d$, and at intervals of every few inches one of the clips is placed upon it. The clips retain the tube upon the drum, act as formers, and prevent contact between the successive turns of the spiral.

Either a single long tube may be arranged in the spiral or two or more shorter ones, and their vulcanization is completed or effected thereon as hereinbefore described.

The method of manufacture of the air-tubes on the formers and clips as hereinbefore described has an advantageous result, inasmuch as the tubes produced have an elliptical cross-section with the major axis of the ellipse in the plane of the wheel. When such a tube is inflated under a non-extensible cover in the usual manner, the outside diameter will not be increased, as it already has the full diameter before inflation. It follows that the tread of the air-tube, not being under tension, will have a very much less tendency to open when punctured at that point than those which are produced in the ordinary manner.

It will be understood that the preliminary partial vulcanization of the air-tubes may be employed or omitted, as may be determined by the conditions of manufacture, and that they may have uniform thickness or not.

Having now described my invention, I declare that what I claim is—

1. The hereinbefore-described process of manufacturing india-rubber tires, which consists in first forming a circular tube, partially vulcanizing it, then confining it in an annular condition, flattened in a direction transverse to the plane of the annulus and completing the vulcanization while in that shape, substantially as described.

2. A device for holding india-rubber tires while being vulcanized, consisting of one or more annular formers each having a width in a direction transverse to the plane of the annulus less than that of the circular tube which is to be vulcanized therein, substantially as described.

3. A device for holding india-rubber tubes while being vulcanized, consisting of a drum D, and washers $d'$ having distance-pieces $d''$, substantially as described.

In testimony that I claim the foregoing as my invention I have signed my name, in presence of two witnesses, this 26th day of February, 1897.

JOSEPH MOSELEY.

Witnesses:
ARTHUR MILLWARD,
WILLIAM E. KEYS.